Feb. 23, 1926.  
G. G. OBERFELL ET AL  
1,574,507
PROCESS AND APPARATUS FOR THE CONTINUOUS TREATMENT OF NATURAL GAS GASOLINES
Filed April 22, 1921    2 Sheets-Sheet 1
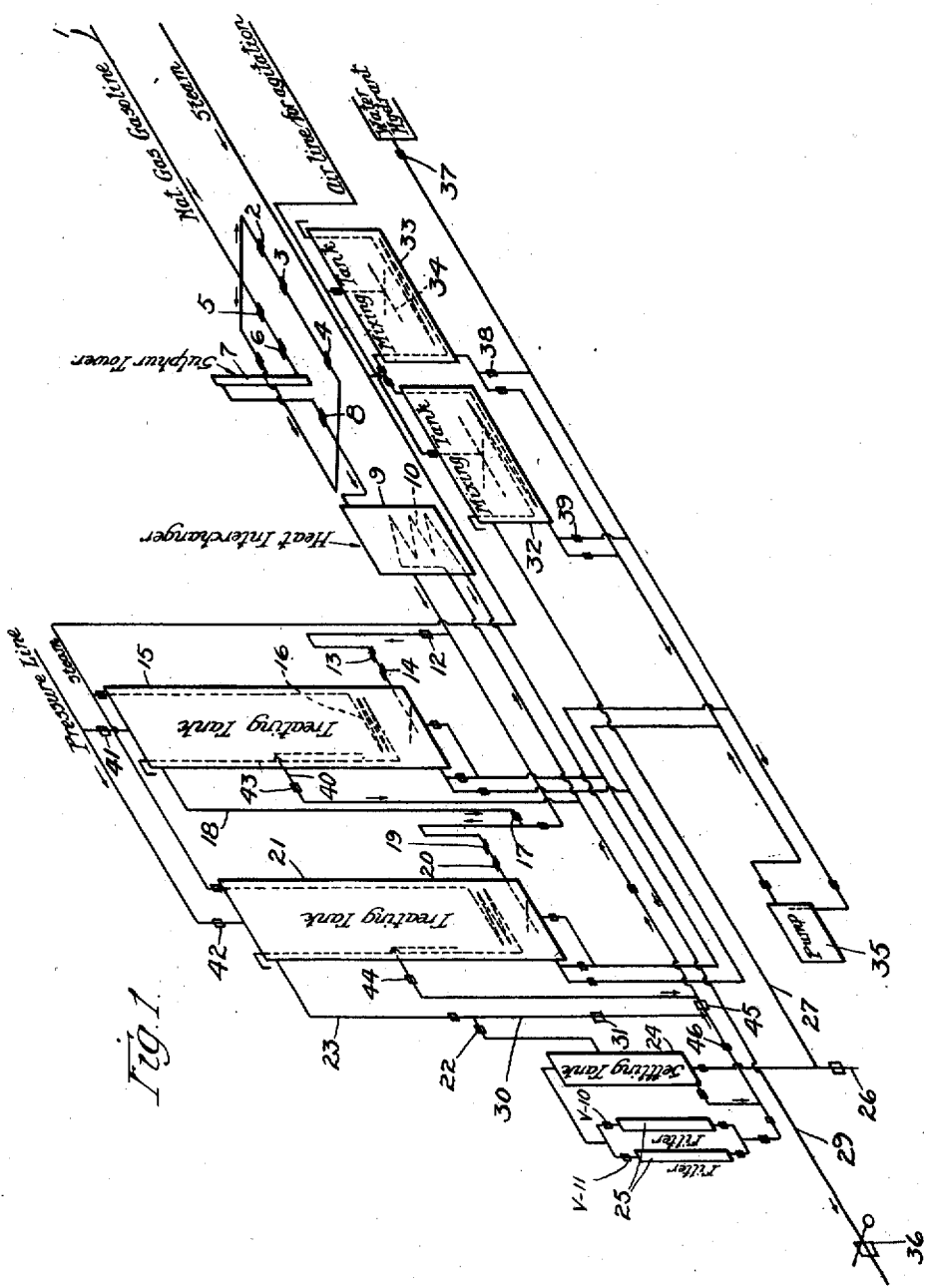

Feb. 23, 1926.                                                1,574,507
                    G. G. OBERFELL ET AL
PROCESS AND APPARATUS FOR THE CONTINUOUS TREATMENT OF NATURAL GAS GASOLINES
                  Filed April 22, 1921         2 Sheets—Sheet 2
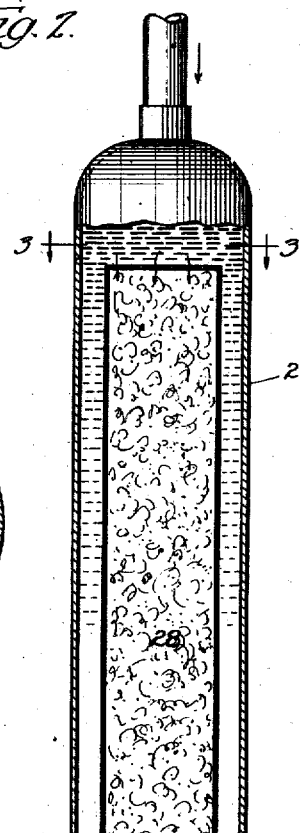
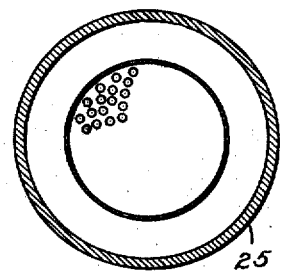
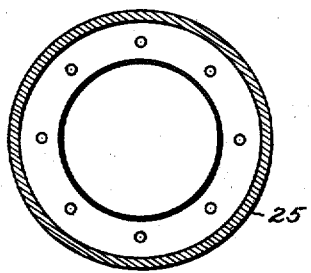
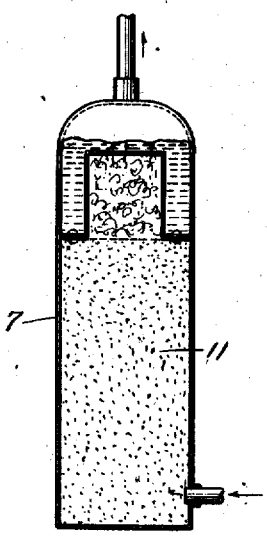
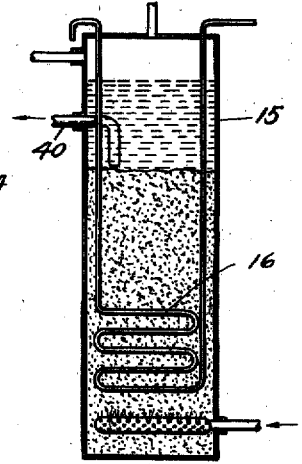

Patented Feb. 23, 1926.

1,574,507

UNITED STATES PATENT OFFICE.

GEORGE GROVER OBERFELL, ALBERT M. BALLARD, RICHARD C. ALDEN, EDWARD L. UTSINGER, AND WILLIAM R. LENTZ, OF TULSA, OKLAHOMA, ASSIGNORS TO CHESTNUT AND SMITH CORPORATION, OF TULSA, OKLAHOMA, A CORPORATION OF OKLAHOMA.

PROCESS AND APPARATUS FOR THE CONTINUOUS TREATMENT OF NATURAL-GAS GASOLINES.

Application filed April 22, 1921. Serial No. 463,589.

*To all whom it may concern:*

Be it known that we, GEORGE G. OBERFELL, ALBERT M. BALLARD, RICHARD C. ALDEN, EDWARD L. UTSINGER, and WILLIAM R. LENTZ, citizens of the United States, residing at Tulsa, in the county of Tulsa and State of Oklahoma, have invented certain new and useful Improvements in Processes and Apparatus for the Continuous Treatment of Natural-Gas Gasolines, of which the following is a specification.

This invention relates to improvements in the treatment of petroleum products and while especially applicable to a continuous treatment of natural gas gasoline it may be applied in other connections if desired without departing from the spirit of our invention.

Petroleum products such as kerosene, naphtha, straight run gasoline and benzine require treatment to remove certain types of decomposable sulphur compounds before those products will pass what is known as the "doctor test" (see U. S. Bureau of Mines Technical Paper No. 214 pp. 24–25).

It is the common practice for refineries to treat the petroleum products by a batch process in which the chemicals for treatment and the product to be treated are placed in a tank and agitated until the product is free from decomposable sulphur compounds as shown by means of the aforementioned doctor test.

Natural gas gasoline obtained by condensation or absorption processes, or by combination of said processes have not heretofore to our knowledge been successfully treated owing to the lack of a satisfactory continuous process for treating such products, and due to the losses encountered during treatment.

Our invention therefore contemplates improvements in the process of treating petroleum products, and employs the use of sodium hydroxide alone or in conjunction with litharge and sulphur as will be hereinafter more fully explained.

Among the objects of our invention are to provide an improved method and apparatus for the continuous treatment of natural gas gasoline to remove the suspended solid particles therefrom; further to treat natural gas gasoline with sodium hydroxide either alone or in conjunction with litharge and sulphur; further to provide a continuous process in which the material being treated may be run through the system a second time if desired; further to provide a novel arrangement of sulphur tower and other tanks; further to provide means to permit part of the incoming natural gas gasoline to be passed around the sulphur tower if desired; further to raise the temperature of the cool incoming gasoline by the warmer out-going gasoline; further to improve generally in process and apparatus for treating natural gas gasoline in a more simple economical and efficacious manner; and such further objects, advantages and capabilities as will later more fully appear.

Our invention further resides in the combination, construction and arrangement of parts illustrated in the accompanying drawings and while we have shown therein a preferred embodiment, we desire the same to be understood as illustrative only and not as limiting the scope of our invention.

In the drawings:—

Fig. 1 is a diagrammatic view showing the arrangement of the sulphur tower and various tanks and other parts in our improved apparatus and showing the various steps and combinations that may be employed in reducing our process to practice.

Fig. 2 is an enlarged view of our filter tank parts being shown in section for the sake of clearness.

Fig. 3 is a section taken on the line 3—3 of Fig. 2 and looking in the direction of the arrows.

Fig. 4 is a section on line 4—4 of Fig. 2.

Fig. 5 is a sectional view showing the interior arrangement of one form of sulphur tower that we may use in carrying out our process.

Fig. 6 is a longitudinal vertical section through the treating tank.

Referring to the drawings and more particularly Fig. 1 it will be seen that the gasoline enters through line 1 and may be either passed through the sulphur tower, or around the same, or parts thereof each way as desired by suitable manipulation of the valves about to be described. Assuming that a portion of the gasoline is to be passed each way, part of the gasoline passes through the valve 2 meter 3 and then through the check valve 4, while the remainder of the gasoline passes through the valve 5 through meter 6 and through the sulphur tower 7 and then through the check valve 8. The meters 3 and 6 serve the purpose of determining the relative amounts of gasoline passing through and around the sulphur tower 7.

This affords a means of regulating the amount of sulphur that is admitted to the treating tanks. If too much sulphur is admitted the gasoline will be of inferior quality as evidenced by the corrosion and gumming test (see U. S. Bureau of Mines Technical Paper No. 214) and by other tests. The percentage of gasoline to be passed through the sulphur tower will depend upon several factors such as kind of sulphur used, construction of sulphur tower, temperature, and nature of the gasoline to be treated. This percentage can be determined by means of proper tests on the treated gasoline. For all ordinary practical conditions this percentage will be between 1 and 50%. Any of the well known types of meters for measuring liquid volumes may be used for maintaining the relative amounts of gasoline which it is desired to pass through and around the sulphur tower. After passing the sulphur tower the incoming gasoline which is frequently of a very low temperature passes through a heat interchanger 9 in which the cool incoming gasoline chills the warm outgoing gasoline within the coils 10 and thereby reduces the losses incident to treatment. The sulphur tower 7, one form of which is shown in detail in Fig. 5, consists of a device in which the elementary sulphur 11 is brought into intimate contact with a portion of the incoming gasoline, which thereby dissolves some of the sulphur prior to treatment.

In refinery practice the excess of elementary sulphur which is introduced to the petroleum product is eliminated by distilling that product. Obviously it is not advisable to treat natural gas gasolines by such a method owing to the losses encountered in distilling the very volatile natural gas gasoline and to the extra cost of distilling the gasoline. We prefer to use what is known as roll sulphur or brimstone in the sulphur tower, since more efficient contact may be obtained between the sulphur and the gasoline, and at the same time cause less resistance to the flow of gasoline, and diminish the chances for mechanically carrying over the elementary sulphur into the treating tank. Flowers of sulphur may be used. In such case, a filtering column of cotton, cloth, felt or some material should be placed in the tower above the sulphur since it is desired to admit to the treating tanks only such sulphur that is dissolved by the gasoline and to prevent any of the sulphur from being carried over mechanically. We have also satisfactorily used flowers of sulphur placed in thin cloth bags and suspended in the sulphur tower. These methods of introducing sulphur to the treating tanks can also be successfully used in treating pertoleum products obtainable by refinery practice. The chief advantage in such cases would consist in reducing the time necessary for agitation, with the result that the losses in refinery practice would be diminished.

After passing the heat exchanger 9 the gasoline passes through the valve 12, through the check valve 13, valve 14 and is then caused to pass up through the caustic plumbite solution containing an excess of litharge within the first treating tank 15.

The treating tank contains closed steam coils 16 for warming the plumbite solution to the desired temperature necessary for treatment of the gasoline. If desired, any other convenient fluid may be used instead of steam for heating purposes, as for example hot gas, warm water, warm oil, etc. The temperature to be carried in the plumbite solution depends upon the nature of the product to be treated, and the construction and number of treating tanks. We prefer to use as low a temperature as possible, so that the temperature of treated gasoline will not be very much higher than that of the untreated incoming gasoline and thereby reduce losses during treatment. We have found that when the temperature of the plumbite solution falls appreciably lower than 40° F. that with two treating tanks in series the average natural gas gasoline begins to show evidences of not being properly treated. We have also found that when the temperature of the plumbite solution is raised above 100° F. that the same arrangement does not appreciably increase the efficiency of treatment and that losses are materially increased unless special precautions are taken to increase the pressure on the treating system and to cool the outgoing treated gasoline.

After passing through the first treating tank 15, the gasoline passes through the valve 17 in pipe 18, through the check valve 19, through the valve 20 and then bubbles up through the plumbite solution in the second treating tank 21, which is constructed similar to the first treating tank. The sketch shows the use of two treating tanks so arranged that they may be used in series or parallel. It is evident that more tanks may be used if desired, and that a similar arrangement can be made if so desired. The number of contacts necessary to properly treat the gasoline will depend primarily upon, the nature of the product, the construction of the treating tanks, temperature, and strength of the plumbite solution. We have found it very convenient to pass the gasoline through the system a second time if the first treatment does not properly treat the gasoline. In such case all of the gasoline is passed around the sulphur tower for the second treatment.

After passing through the second tank 21, the gasoline passes through the valve 22 in pipe 23, through the settling tank 24, and then through either the valve $V^{10}$ or $V^{11}$ and then through one of the filter tanks 25.

The settling tank 24, serves the purpose of preventing the plumbite solution from being carried over with the gasoline into the filter or into the place of storage of the gasoline. The reaction occurring during treatment of gasoline results in a scum which has a tendency to float on the plumbite solution. Part of this is carried along with the gasoline. The settling tank therefore also serves as an additional reservoir for separation of the scum and the gasoline. The remainder of the material carried along with the gasoline is removed by the filter as described below. The bottom of the settling tank is connected to a drain 26 or to the mixing tanks through pipe 27, for disposal of the plumbite solution carried over with the gasoline, as will be explained later.

The filter as shown in detail in Fig. 2 consists of a metal receptacle containing a filler 28, of cotton, cloth, wool, felt, asbestos, steel wool, glass wool or similar material which removes the solid material carried over mechanically with the gasoline which will settle from the gasoline upon standing and introduces little difficulty in filtering. Fig. 1 shows two filters in parallel so arranged that one of the filters may be opened up and cleaned while the other is in operation, thus rendering it unnecessary to shut down for repair of filter, or change of the filtering medium.

After leaving the filter the gasoline is passed through the heat interchanger 9, and then through pipe line 29 directly to the cars at the loading track or sent to a storage tank or disposed of otherwise if desired. If it is deemed unnecessary to pass the treated gasoline through the settling tank or through the filter it may be passed directly through the heat interchangers by the way of pipes 30, and 31.

The two mixing tanks 32 and 33 shown in Fig. 1 are each equipped with perforated pipes 34, for agitation with gas or with air and also equipped with closed steam coils for heating the sodium hydroxide as is advisable to facilitate the solution of litharge by means of the sodium hydroxide solution. It has been found that the sodium hydroxide solution may be varied within wide limits. We have successfully used solutions varying in strength from ¼ to 4 lbs. per gallon.

An excess of litharge is added so that a liberal amount of litharge is carried in suspension when the plumbite solution is pumped into the treating tanks.

The circulating pump 35 and its connecting pipes are so arranged that the plumbite solution can be pumped from one mixing tank to the other or from either of the mixing tanks to the treating tanks or vice versa.

This arrangement of apparatus is shown as treating gasoline under pressure since pressure will aid in reducing the losses incident to treating. We prefer to treat the gasoline at about 30 pounds gauge pressure, although higher or lower pressures may be used if desired. The pressure is maintained by means of a weighted valve 36 on the outgoing gasoline line 29, leading from the heat interchanger.

The mixing tanks are also used as a medium for the purpose of removing the scum formed by treating the gasoline. In such case the plumbite solution is blown into the mixing tank, allowed to settle and the scum skimmed from the surface of the plumbite solution.

The water necessary for making the plumbite solution is passed into the mixing tanks, through the valves 37 and 38 or 37 and 39.

Referring again to the treating tanks it will be seen, that these tanks are each also equipped with an outlet gasoline pipe 40 extending down into the treating tanks to just above the plumbite solution. By opening the valves 41 and 42 gas pressure is placed in the treating tanks, and practically all the gasoline remaining in the treating tanks may be blown therefrom by way of valves 43, 44, 45 and 46. This precedure is necessary at end of treatment of a quantity of gasoline, if it is desired alternately to treat gasoline of different grades and prevent the quality of one grade of gasoline from being affected by the properties of the grade of gasoline previously treated.

We have discovered that a sodium hydroxide solution alone may be used for treatment of raw casing head gasoline. The solution, however, readily becomes contaminated with substances removed from the gasoline thus rendering the caustic solution unfit for further use until it is regenerated by addition of litharge and sulphur as explained in the description above. If the spent caustic solution is not regenerated by the process described above, the cost of treatment will be considerably greater.

Having now described our invention, we claim:—

1. The process of treating natural gas gasoline which consists in dissolving therein a quantity of elementary sulphur, and then passing the gasoline through a solution of sodium hydroxide without distilling the gasoline.

2. The process of treating natural gas gasoline which consists in dissolving therein a quantity of sulphur, and then passing the gasoline through a solution of sodium hydroxide containing litharge.

3. The method of treating relatively cool gasoline which consists in dissolving sulphur therein, passing the gasoline through a solution of sodium hydroxide and litharge, and passing the gasoline into heat exchanging relation with the incoming, relatively cool, gasoline prior to treatment with the sodium hydroxide whereby said relatively hot, treated gasoline is cooled and said incoming relatively cool gasoline is substantially heated.

4. That step in the process of treating natural gas gasoline which consists in dissolving sulphur therein and then passing it through a warmed plumbite solution under pressure.

5. An apparatus of the class described comprising a source of gasoline to be treated, a sulphur tower, a by-pass for said tower, means for passing the gasoline from said source through said tower or through said by-pass, means for measuring the flow through said tower and by-pass, a tank containing sodium hydroxide, means connecting the outlet of said tower and said by-pass with said tank.

6. Apparatus of the class described comprising a sulphur tower, means for selectively passing incoming gasoline through or around the tower as desired, a treating tank containing sodium hydroxide, means for causing the gasoline to pass through said sodium hydroxide, and a heat interchanger between said tower and said tank.

7. An apparatus for treating natural gas gasoline consisting in means for passing gasoline through shunt passages, means for determining the flow through each passage, means for dissolving sulphur in the gasoline passing through one of the shunt passages, and means for regulating the flow through each of the shunt passages.

8. An apparatus comprising a source of gasoline, a discharge therefor, means for passing the gasoline through shunt passages on its flow from the source to its discharge, means for dissolving sulphur in the gasoline passing through one of the shunt passages, means for controlling the flow of gasoline through the passages, means for treating the gasoline with sodium hydroxide without interrupting its flow from the sulphur treating means to the discharge.

9. An apparatus for treating natural gas gasoline, consisting in a source of natural gas gasoline, a discharge therefor, means for passing the gasoline through shunt passages, means for dissolving sulphur in the gasoline passing through one of the shunt passages, means for controlling the gasoline flow through each passage, means for passing the gasoline through heated sodium hydroxide.

In witness whereof, we hereunto subscribe our names to this specification.

GEORGE GROVER OBERFELL.
ALBERT M. BALLARD.
RICHARD C. ALDEN.
EDWARD L. UTSINGER.
WILLIAM R. LENTZ.

a quantity of elementary sulphur, and then passing the gasoline through a solution of sodium hydroxide without distilling the gasoline.

2. The process of treating natural gas gasoline which consists in dissolving therein a quantity of sulphur, and then passing the gasoline through a solution of sodium hydroxide containing litharge.

3. The method of treating relatively cool gasoline which consists in dissolving sulphur therein, passing the gasoline through a solution of sodium hydroxide and litharge, and passing the gasoline into heat exchanging relation with the incoming, relatively cool, gasoline prior to treatment with the sodium hydroxide whereby said relatively hot, treated gasoline is cooled and said incoming relatively cool gasoline is substantially heated.

4. That step in the process of treating natural gas gasoline which consists in dissolving sulphur therein and then passing it through a warmed plumbite solution under pressure.

5. An apparatus of the class described comprising a source of gasoline to be treated, a sulphur tower, a by-pass for said tower, means for passing the gasoline from said source through said tower or through said by-pass, means for measuring the flow through said tower and by-pass, a tank containing sodium hydroxide, means connecting the outlet of said tower and said by-pass with said tank.

6. Apparatus of the class described comprising a sulphur tower, means for selectively passing incoming gasoline through or around the tower as desired, a treating tank containing sodium hydroxide, means for causing the gasoline to pass through said sodium hydroxide, and a heat interchanger between said tower and said tank.

7. An apparatus for treating natural gas gasoline consisting in means for passing gasoline through shunt passages, means for determining the flow through each passage, means for dissolving sulphur in the gasoline passing through one of the shunt passages, and means for regulating the flow through each of the shunt passages.

8. An apparatus comprising a source of gasoline, a discharge therefor, means for passing the gasoline through shunt passages on its flow from the source to its discharge, means for dissolving sulphur in the gasoline passing through one of the shunt passages, means for controlling the flow of gasoline through the passages, means for treating the gasoline with sodium hydroxide without interrupting its flow from the sulphur treating means to the discharge.

9. An apparatus for treating natural gas gasoline, consisting in a source of natural gas gasoline, a discharge therefor, means for passing the gasoline through shunt passages, means for dissolving sulphur in the gasoline passing through one of the shunt passages, means for controlling the gasoline flow through each passage, means for passing the gasoline through heated sodium hydroxide.

In witness whereof, we hereunto subscribe our names to this specification.

GEORGE GROVER OBERFELL.
ALBERT M. BALLARD.
RICHARD C. ALDEN.
EDWARD L. UTSINGER.
WILLIAM R. LENTZ.

---

Certificate of Correction.

It is hereby certified that in Letters Patent No. 1,574,507, granted February 23, 1926, upon the application of George Grover Oberfell, Albert M. Ballard, Richard C. Alden, Edward L. Utsinger, and William R. Lentz, of Tulsa, Oklahoma, for an improvement in "Processes and Apparatus for the Continuous Treatment of Natural-Gas Gasolines," an error appears in the printed specification requiring correction as follows: Page 4, line 43, claim 6, after the word "tank," and before the period, insert a comma and the words , *through which the gasoline passes in passing from the tower to the tank;* and that the said Letters Patent should be read with this correction therein that the same may conform to the record of the case in the Patent Office.

Signed and sealed this 25th day of May, A. D. 1926.

[SEAL.]

WM. A. KINNAN,
*Acting Commissioner of Patents.*

Certificate of Correction.

It is hereby certified that in Letters Patent No. 1,574,507, granted February 23, 1926, upon the application of George Grover Oberfell, Albert M. Ballard, Richard C. Alden, Edward L. Utsinger, and William R. Lentz, of Tulsa, Oklahoma, for an improvement in " Processes and Apparatus for the Continuous Treatment of Natural-Gas Gasolines," an error appears in the printed specification requiring correction as follows: Page 4, line 43, claim 6, after the word " tank," and before the period, insert a comma and the words , *through which the gasoline passes in passing from the tower to the tank;* and that the said Letters Patent should be read with this correction therein that the same may conform to the record of the case in the Patent Office.

Signed and sealed this 25th day of May, A. D. 1926.

[SEAL]

WM. A. KINNAN,
*Acting Commissioner of Patents.*